Patented May 7, 1929.

1,711,754

UNITED STATES PATENT OFFICE.

JARED E. SMITH, OF GALVESTON, TEXAS.

COMPOSITION OF MATTER.

No Drawing.  Application filed December 30, 1926. Serial No. 158,133.

This invention relates to new and useful improvements in a composition of matter.

One object of the invention is to provide a composition of matter particularly designed for use as a coating for electrical conductors and connections where acid fumes are present for the purpose of protecting the connections against the corrosive influence of such fumes and particularly from sulphuric acid fumes arising from storage batteries.

Another object of the invention is to provide a composition of matter composed of ingredients that are relatively cheap and readily obtainable and which may thereby be cheaply and easily produced.

A further feature of the invention is to provide a composition of the character described which may be readily applied to the parts to be protected, and which, when applied, will form a protecting coat or envelope around said parts to exclude the injurious acid fumes from coming into contact therewith.

With the above and other objects in view the invention has particular relation to a novel combination of the ingredients having the characteristics and for the purpose to be presently set forth.

The composition is composed mainly of petroleum residuum and creosote. The petroleum residuum is a well known by-product resulting from the distillation of crude petroleum and consists in the main of carbon and asphalt with a certain amount of gas oils therein. This petroleum residuum forms the body of the composition and has a high flashing point and consequently not liable to be ignited by electric sparks from short circuits. The creosote is employed for cutting or thinning the petroleum residuum and also neutralizes or oxidizes the sulphuric acid fumes.

The above mentioned elements are mixed in approximately the proportions of ninety-nine and five-tenths petroleum residuum and five-tenths per cent creosote so as to form a paint-like liquid of from fourteen to eighteen degrees Baumé.

The composition is applied to the parts to be protected by coating said parts with it in a manner similar to the application of paint to a surface to be coated and will form a tough surrounding coat or cover completely enveloping and protecting the parts to be protected from acid fumes, which may be present and particularly from sulphuric acid fumes given off from storage batteries.

What I claim is:—

A composition for coating electrical conductors consisting essentially of petroleum residuum and creosote intimately mixed together in proportions of approximately ninety-nine and five-tenths percent petroleum residuum and five-tenths percent creosote.

In testimony whereof I have signed my name to this specification.

JARED E. SMITH.